UNITED STATES PATENT OFFICE.

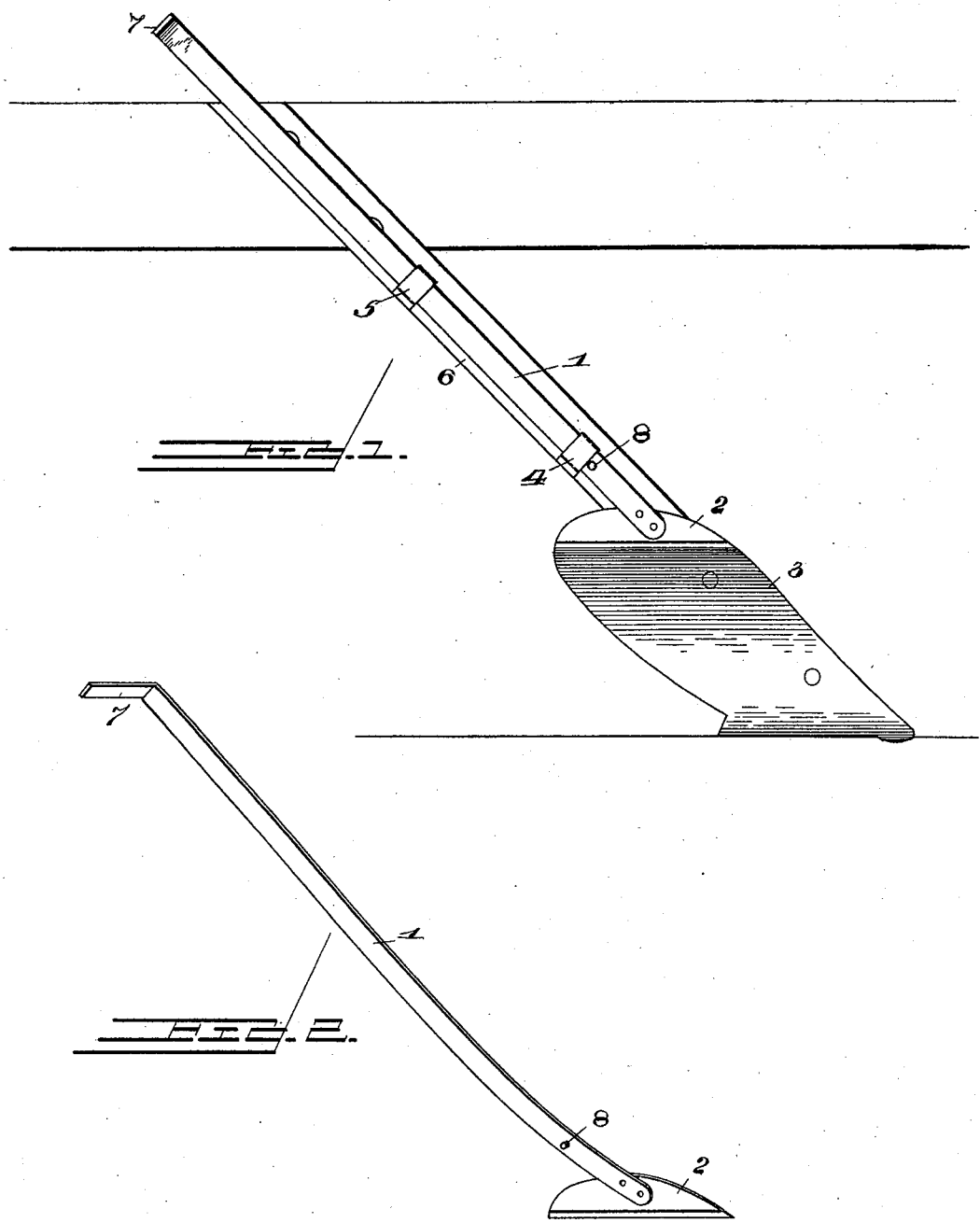

ROBERT LITEL JACKSON, OF McKINNEY, TEXAS.

PLOW-SCRAPER.

SPECIFICATION forming part of Letters Patent No. 563,378, dated July 7, 1896.

Application filed October 2, 1895. Serial No. 564,424. (No model.)

*To all whom it may concern:*

Be it known that I, ROBERT LITEL JACKSON, a citizen of the United States, residing at McKinney, in the county of Collin and State of Texas, have invented a new and useful Plow-Scraper, of which the following is a specification.

My invention relates to plow-scraping devices, and has for its object to provide a simple, inexpensive, and efficient attachment so arranged as to be normally held in operative relation with the moldboard of a plow, whereby it may be depressed at any time and without checking the movement of the plow to scrape accumulated soil from the surface thereof.

Further objects and advantages of this invention will appear in the following description, and the novel features thereof will be particularly pointed out in the appended claims.

In the drawings, Figure 1 is a side view of a scraper constructed in accordance with my invention applied in the operative position to a plow. Fig. 2 is a detail view of the scraper detached.

Similar numerals of reference indicate corresponding parts in both figures of the drawings.

The shank 1 of the scraper embodying my invention consists of a spring-metal bar terminating at its lower end in a blade 2, which is arranged in contact with the operating-surface of the moldboard 3 of a plow, the shank being provided, as shown in Fig. 2, with a normal bend or curve, which causes the blade to bear firmly and with a uniform pressure upon the surface of the moldboard. The guides 4 and 5, which are attached to the standards 6 of the plow, maintain the shank of the scraper in position, and they are so arranged with relation to each other as to insure the positive pressure of the blade against the surface of the moldboard. The shank terminates at its upper end in a lateral projection or handle 7, which may be grasped by the operator in order to depress the device and thereby cause the blade to traverse the moldboard.

The shank is provided below the lowermost guide with a stop-pin 8, adapted to engage said guide and check the upward movement of the scraper, and in the construction illustrated the upper edge of the blade of the scraper conforms or corresponds in configuration with the corresponding upper edge of the moldboard, whereby when the scraper is elevated, as shown in Fig. 1, the blade thereof lies snugly against the surface of the upper end of the moldboard, and is flush at its upper edge therewith, to avoid breaking the surface of the moldboard or offering any obstruction to the passage of the soil in traversing the same.

Various changes in the form, proportion, and the minor details of construction may be resorted to without departing from the spirit or sacrificing any of the advantages of this invention.

Having described my invention, what I claim is—

1. A scraper for plows having a spring-metal shank adapted to be mounted in guides upon the standard of the plow and terminating at its lower end in a blade to traverse the surface of the plow, said shank having a normal bend which forces the blade tightly against the surface of the plow and maintains the scraper by friction at any desired adjustment, substantially as specified.

2. The combination with a moldboard of a plow, of fixed guides adapted to be supported by a plow-standard, a spring-metal shank having a normal bend mounted to slide in said guides and provided with a stop-pin to limit its upward movement, said shank terminating at its lower end in a blade to traverse the surface of the moldboard and at its upper end with a handle, the shank being held from accidental sliding movement by frictional contact with the guides at any desired adjustment, said frictional contact being caused by the tendency of the shank to assume a position different from that in which it is held by the guides, and the blade being constructed to correspond in contour with the contiguous end of the moldboard and to lie in close contact with the surface of the same, substantially as specified.

In testimony that I claim the foregoing as my own I have hereto affixed my signature in the presence of two witnesses.

ROBERT LITEL JACKSON.

Witnesses:
J. L. HOOPER,
M. NEWMAN.